United States Patent
Butler et al.

(10) Patent No.: US 6,587,236 B1
(45) Date of Patent: Jul. 1, 2003

(54) FIBER OPTIC ERRORLESS SWITCHING SYSTEM

(75) Inventors: Robert Butler, Olathe, KS (US); William C. Szeto, Richardson, TX (US); Mark Loyd Jones, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/479,538

(22) Filed: Jan. 7, 2000

(51) Int. Cl.[7] .............................................. H04B 10/08
(52) U.S. Cl. ...................... 359/110; 359/158
(58) Field of Search ............................. 359/110, 158, 359/117, 128, 139

(56) References Cited

U.S. PATENT DOCUMENTS 5,051,979 A * 9/1991 Chaudhuri et al. ......... 370/506
5,285,441 A * 2/1994 Bansal et al. ............... 370/218
5,506,956 A   4/1996 Cohen
5,577,196 A   11/1996 Peer
5,745,476 A * 4/1998 Chaudhuri .................. 370/222
5,809,406 A * 9/1998 Taki et al. ................... 375/232

OTHER PUBLICATIONS

"DCN 212," p. 1, (Jul. 26, 1999). See website "http://www.oneplusonetech.com/DCN212.htm".

* cited by examiner

Primary Examiner—Kinfe-Michael Negash
(74) Attorney, Agent, or Firm—Harley R. Ball; Steven J. Funk; Kevin D. Robb

(57) ABSTRACT

An errorless switching system is disclosed that is comprised of a fault detector, a synchronization system, and a switching system. The synchronization system aligns a first data signal and a second data signal. The fault detector detects errors in the data signals and instructs the switching system to transfer the first data signal or the second data signal to avoid transferring the erroneous data. No data is lost or duplicated because the data signals are aligned at the switching system.

8 Claims, 4 Drawing Sheets

FIBER OPTIC ERRORLESS SWITCHING SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of fiber optic communication systems, and in particular, to fiber optic systems that provide errorless switching.

2. Description of the Prior Art

FIG. 1 depicts the current system of switching used in fiber optic networks. A first node 101 connects to a second node 102 via a first optical fiber 150 and a second optical fiber 160. The second node 102 is comprised of a first optical-to-electrical converter 120, a second optical-to-electrical converter 121, a first fault detector 130, a second fault detector 131, and a switching system 140. The first optical-to-electrical converter 120 connects to the first node 101 via the first optical fiber 150. The first optical-to-electrical converter 120 connects to the first fault detector 130 via electrical data line 151. The first fault detector 130 connects to the switching system 140 via electrical data line 153 and electrical control line 152.

The second optical-to-electrical converter 121 connects to the first node 101 via the second optical fiber 160. The second optical-to-electrical converter 121 connects to the second fault detector 131 via electrical data line 161. The second fault detector 131 connects to the switching system 140 via electrical data line 163 and electrical control line 162.

In operation, the first node 101 transmits a first data signal over the first optical fiber 150. The first optical-to-electrical converter 120 receives the first data signal and converts it from an optical signal to an electrical signal. The first optical-to-electrical converter 120 transfers the first data signal to the first fault detector 130 via electrical data line 151. The first fault detector 130 determines if an error has occurred in the transmission of the first data signal and generates a first error instruction if an error has occurred. The first fault detector 130 transfers the first data signal to the switching system 140 via electrical data line 153. The first fault detector 130 transfers any first error instructions to the switching system 140 via electrical control line 152.

The first node 101 transmits a second data signal over the second optical fiber 160. The second optical-to-electrical converter 121 receives the second data signal and converts it from an optical signal to an electrical signal. The second optical-to-electrical converter 121 transfers the second data signal to the second fault detector 131 via electrical data line 161. The second fault detector 131 determines if an error has occurred in the transmission of the second data signal and generates a second error instruction if an error has occurred. The second fault detector 131 transfers the second data signal to the switching system 140 via electrical data line 163. The second fault detector 131 transfers any second error instructions to the switching system 140 via electrical control line 162.

The switching system 140 receives the first data signal, the second data signal, and any first or second error instructions. The switching system 140 transfers either the first data signal or the second data signal. The signal that gets transferred depends on the first error instruction and the second error instruction. For example, if an error occurs on the first data signal, the first error instruction instructs the switching system 140 to transfer the second data signal and not the first data signal. If an error occurs on the second data signal, the second error instruction instructs the switching system 140 to transfer the first data signal and not the second data signal.

Two problems exist with the system in FIG. 1. One problem is that duplicate data can be transferred in the switching process. For example, consider the situation where the second data signal lags behind the first data signal. The lag in the second data signal causes the signals to be mis-aligned at the switching system 140. Assume for this example that the second data signal lags the first data signal by ten blocks of data. When the switching system 140 changes from transferring the first data signal to transferring the second data signal, those ten blocks of data have already been transferred on the first data signal. After the switching system 140, the ten blocks of data will again be transferred on the second data signal. The amount of duplicated data depends on how far the second data signal lagged behind the first data signal.

Another problem is that data can be lost in the switching process. Consider the other situation where the first data signal lags behind the second data signal. The lag in the first data signal causes the data to be mis-aligned at the switching system 140. Assume for this example that the first data signal lags the second data signal by ten blocks of data. When the switching system 140 changes from transferring the first data signal to transferring the second data signal, ten blocks of data will have been missed. The amount of data lost depends on how far the first data signal lags behind the second data signal.

Errorless switching exists in other communications networks such as microwave communication networks, but doesn't exist in fiber optic systems. Fiber optic communication networks traditionally utilize Synchronous Optical Network (SONET) rings to provide two transmission paths to switch between. These fiber optic communication networks do not provide for errorless switching. By today's standards, switching resulting in duplicate or lost data is not acceptable.

SUMMARY OF THE SOLUTION

The invention solves the above problem by aligning the first data signal with the second data signal in the optic node before switching occurs. Data is not lost or duplicated in the switching process.

The errorless switching system is comprised of a first fault detector, a second fault detector, a synchronization system, and a switching system. The synchronization system aligns the first data signal with the second data signal. The fault detectors detect errors in the data signals and instruct the switching system to transfer the first data signal or the second data signal to avoid transferring erroneous data. No data is lost or duplicated because the data signals are aligned at the switching system.

DETAILED DESCRIPTION OF THE PREFERRED EMBODIMENT

Figure 1:
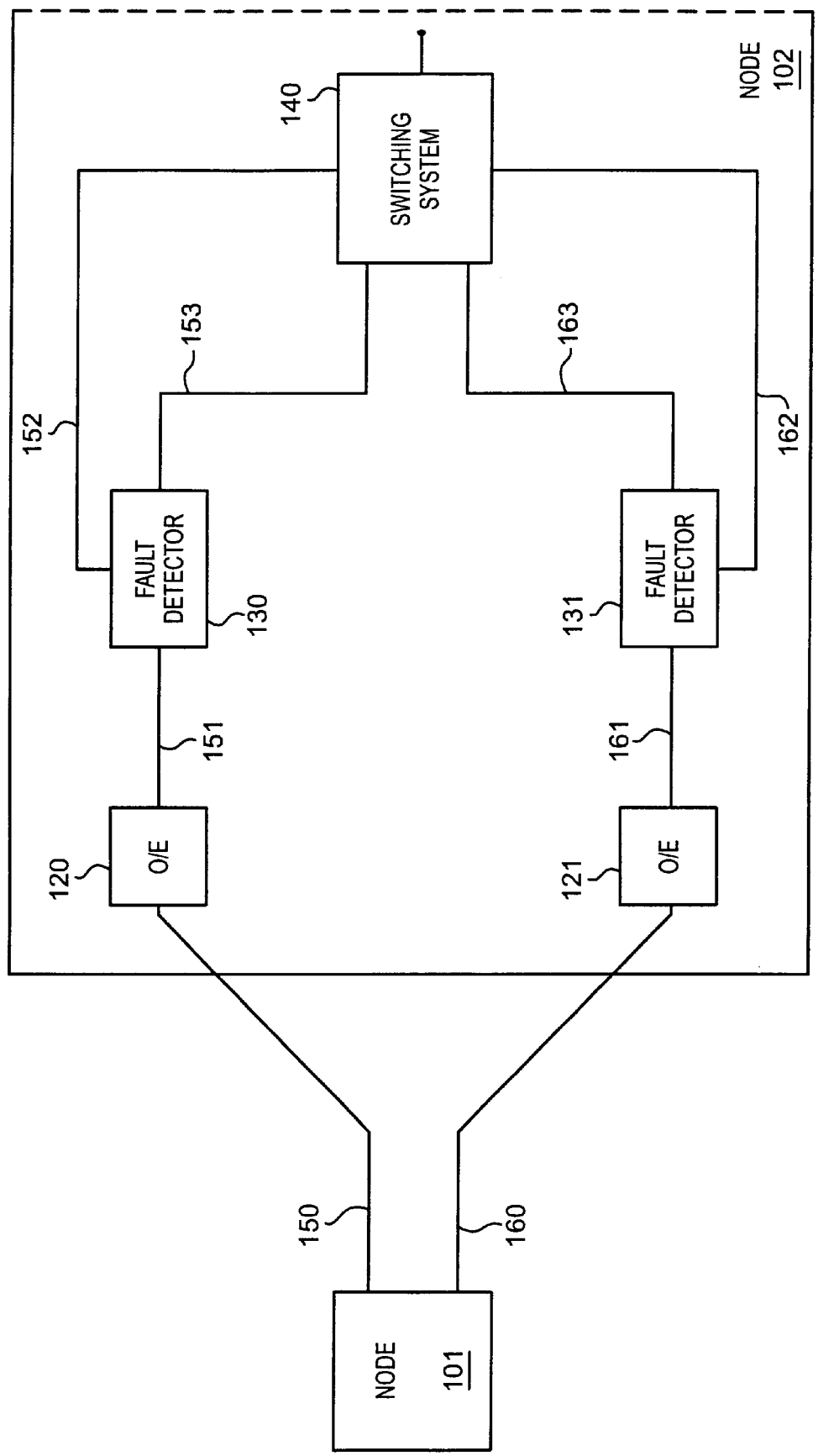
FIG. 1 is prior art and is an example of a switching network in a fiber optic system.
Figure 2:
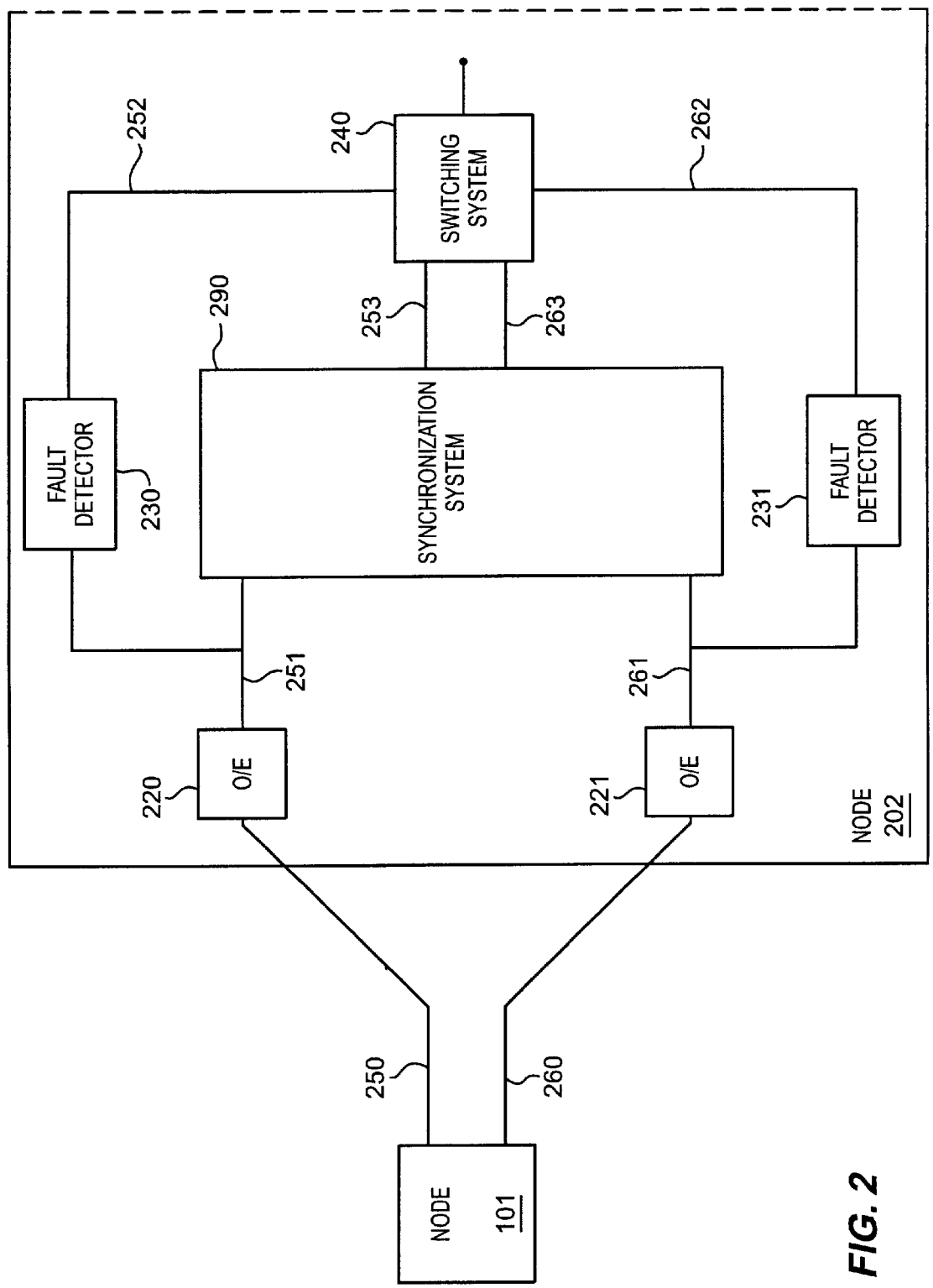
FIG. 2 is an example of the invention showing a switching network in a fiber optic system that provides errorless switching.
Figure 3:
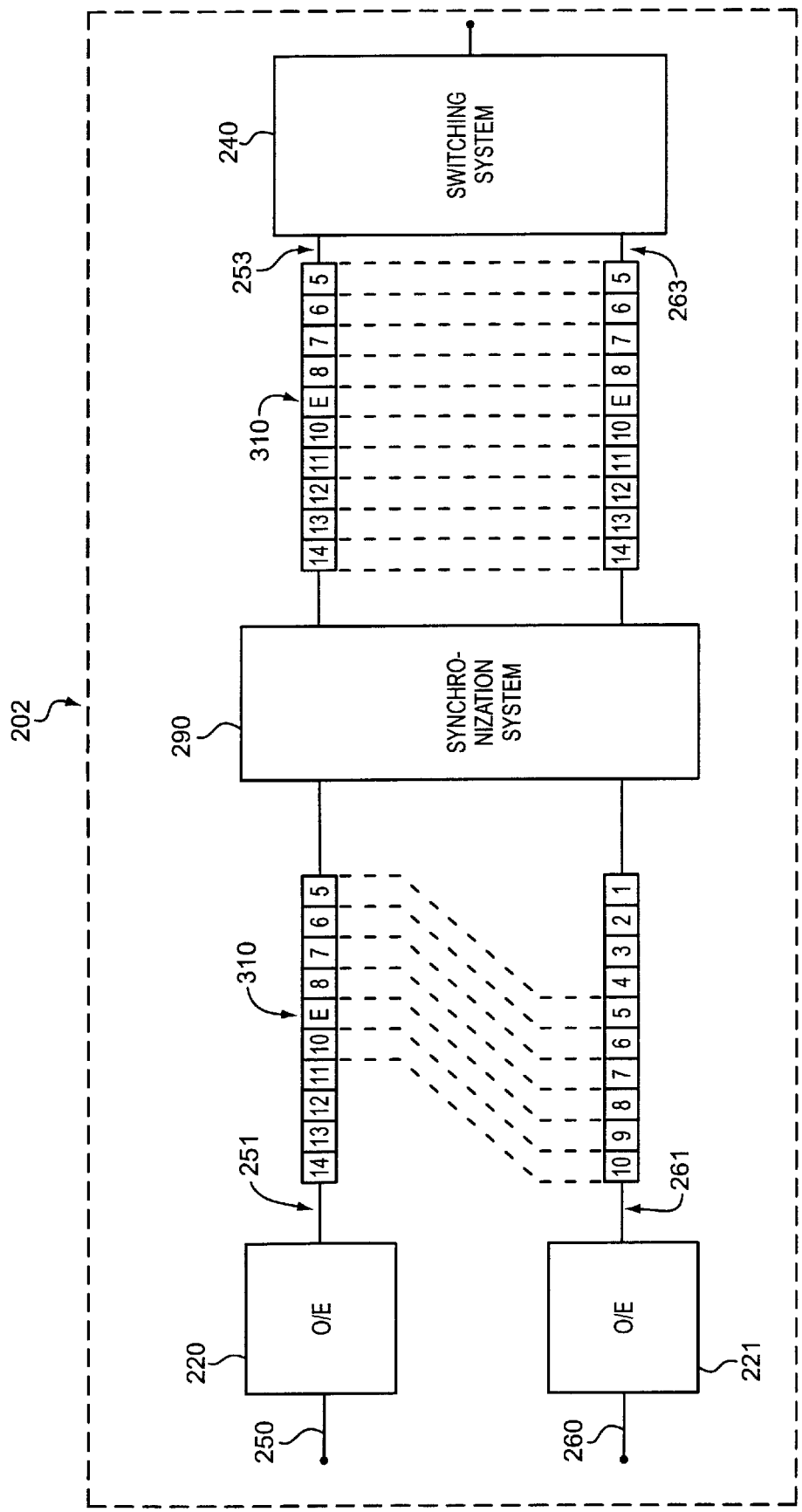
FIG. 3 is an example of two data signals being mis-aligned as they enter an optic node and then becoming aligned before reaching a switching system.
Figure 4:
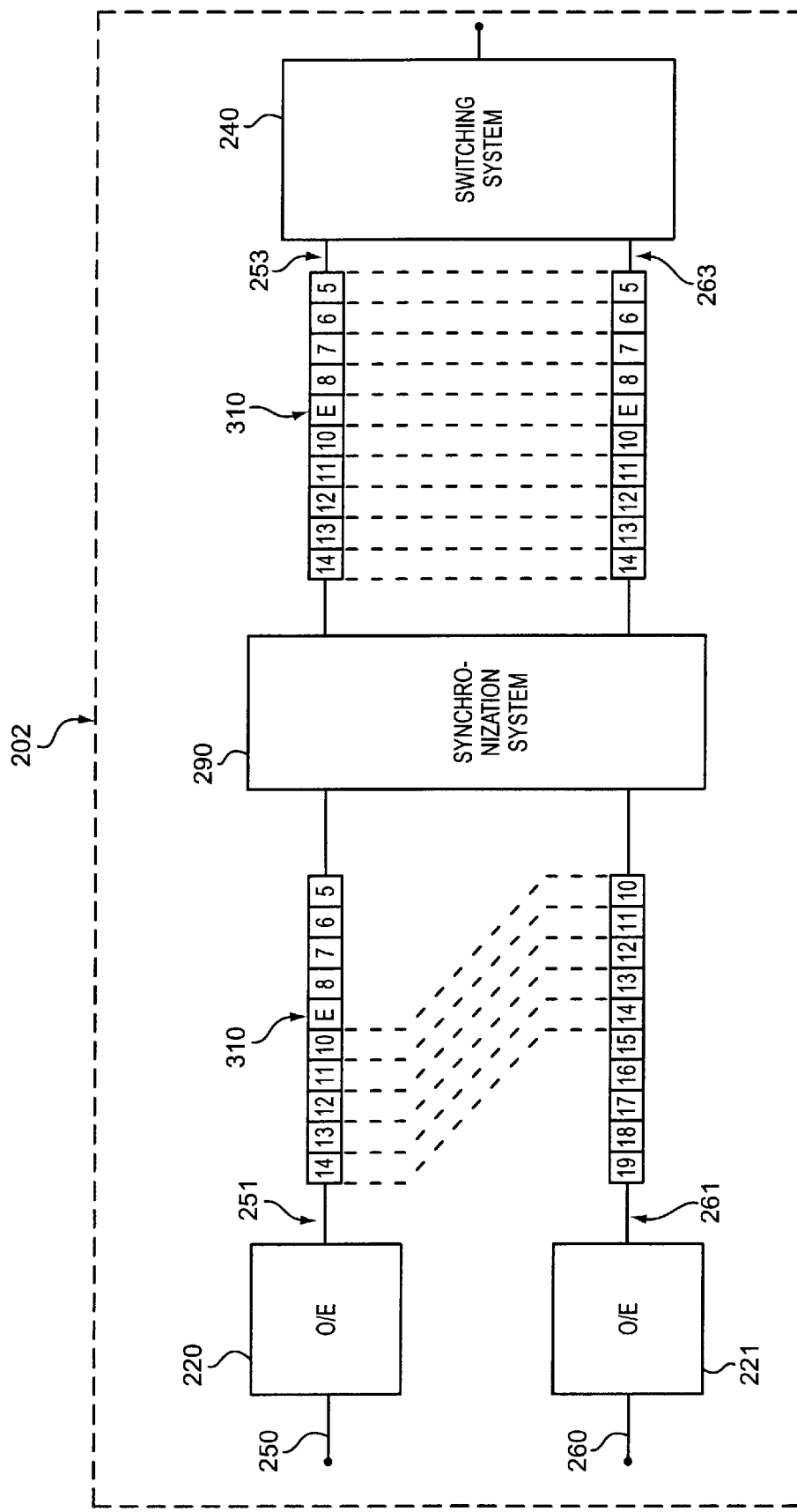
FIG. 4 is an example of two data signals being mis-aligned as they enter an optic node and then becoming aligned before reaching a switching system.

System Configuration and Operation—FIGS. 2–4

FIG. 2 depicts a specific example of an errorless switching network in accord with the present invention. Those skilled in the art will appreciate numerous variations from this example that do not depart from the scope of the invention. Those skilled in the art will also appreciate that various features could be combined to form multiple variations of the invention.

FIG. 2 shows a first node 201 connected to a second node 202 via a first optical fiber 250 and a second optical fiber 260. The second node 202 is comprised of a first optical-to-electrical converter 220, a second optical-to-electrical converter 221, a first fault detector 230, a second fault detector 231, a synchronization system 290, and a switching system 240. The first node 201 connects to the first optical-to-electrical converter 220 via the first optical fiber 250. The first optical-to-electrical converter 220 connects to the first fault detector 230 and the synchronization system 290 via electrical data line 251. The first fault detector 230 connects to the switching system 240 via electrical control line 252. The synchronization system 290 connects to the switching system 240 via electrical data line 253.

The first node 201 connects to the second optical-to-electrical converter 221 via the second optical fiber 260. The second optical-to-electrical converter 221 connects to the second fault detector 231 and the synchronization system 290 via electrical data line 261. The second fault detector 231 connects to the switching system 240 via electrical control line 262. The synchronization system 290 connects to the switching system 240 via electrical data line 263.

Those skilled in the art will appreciate that the switching system 240 is any electronic switch, optical switch, transistor, circuit, processor, buffer, memory controller, gate array, or any other device or method for transferring one of two, or more, data signals when commanded. Likewise, the synchronization system 290 is any system that can align two or more signals.

In operation, the first node 201 transmits a first data signal over the first optical fiber 250. The first node 201 also transmits a second data signal over the second optical fiber 260. The first data signal and the second data signal are typically unaligned. The first optical-to-electrical converter 220 receives the first data signal and converts it from an optical signal to an electrical signal. The first optical-to-electrical converter 220 transfers the first data signal to the first fault detector 230 and the synchronization system 290 via electrical data line 251. The first fault detector 230 determines if an error has occurred in the transmission of the first data signal, and generates a first error instruction if an error has occurred. The first fault detector 230 transfers any first error instructions to the switching system 240 via electrical control line 252. The synchronization system 290 receives and aligns the first data signal and the second data signal. The synchronization system 290 transfers the first data signal to the switching system 240 via electrical data line 253 and the second data signal via electrical data line 263.

As stated above, the first node 201 sends the second data signal over the second optical fiber 260. The second optical-to-electrical converter 221 receives the second data signal and converts it from an optical signal to an electrical signal. The second optical-to-electrical converter 221 transfers the second data signal to the second fault detector 231 and the synchronization system 290 via electrical data line 261. The second fault detector 231 determines if an error has occurred in the transmission of the second data signal, and generates a second error instruction if an error has occurred. The second fault detector 231 transfers any second error instructions to the switching system 240 via electrical control line 262.

FIG. 3 shows a data-level view of the system in FIG. 2 in operation. The first data signal, shown in the form of blocks of data, travels on electrical data line 251 from the optical-to-electrical converter 220 to the synchronization system 290. The second data signal, shown in the form of blocks of data, travels on electrical data line 261 from the optical-to-electrical converter 221 to the synchronization system 290. Each sequential number 1–14 in FIG. 3 represents a block of data. The first data signal is the same as the second data signal except for an error 310 in the first data signal. The signals are mis-aligned with the second data signal lagging behind the first data signal when they enter the synchronization system 290. The synchronization system 290 aligns the first data signal and the second data signal before the signals reach the switching system 240.

The first data signal contains the error 310. If the data signals remained unaligned, switching from first data signal to second data signal to avoid the error 310 would result in duplicate data being transferred. A later switch back to the first data signal from the second data signal would result in a loss of data. With the data signals aligned by the synchronization system 290, switching from the first data signal to the second data signal to avoid the error 310 does not result in duplicate or lost data.

FIG. 4 represents the same concept as FIG. 3 except the first data signal lags behind the second data signal. The first data signal contains the error 310. If the data signals remained unaligned, switching from the first data signal to the second data signal to avoid transferring the error 310 would result in data being lost. A later switch back to the first data signal from the second data signal would result in duplicate data being transferred. With the data signals aligned by the synchronization system 290, switching from the first data signal to the second data signal to avoid the error 310 does not result in duplicate or lost data.

Those skilled in the art will appreciate variations of the above-described embodiments that fall within the scope of the invention. As a result, the invention is not limited to the specific examples and illustrations discussed above, but only by the following claims and their equivalents.

We claim:

1. A fiber optic node comprising:

a first optical-to-electrical converter coupled to a first optical fiber and configured to receive and convert a first data signal;

a second optical-to-electrical converter coupled to a second optical fiber and configured to receive and convert a second data signal;

a first fault detector coupled to the first optical-to-electrical converter and configured to monitor the first data signal for errors;

a second fault detector coupled to the second optical-to-electrical converter and configured to monitor the second data signal for said errors;

a synchronization system comprising a sync generator connected to a buffer, wherein the synchronization system is coupled to the first optical-to-electrical converter and the second optical-to-electrical converter, and wherein the synchronization system is configured to receive the first data signal and the second data signal, align the first data signal and the second data signal using the sync generator and the buffer, and transfer the first data signal and the second data signal; and a switching system coupled to the synchronization system, the first fault detector, and the second fault detector, and configured to transfer the first data signal if said errors are detected in the second data signal and transfer the second data signal if said errors are detected in the first data signal.

2. The fiber optic node as in claim 1 wherein the first fault detector is configured to generate a first error instruction if said errors are detected in the first data signal and transmit the first error instruction to the switching system.

3. The fiber optic node as in claim 2 wherein the switching system is configured to transmit the second data signal in response to receiving the first error instruction.

4. The fiber optic node as in claim 1 wherein the second fault detector is configured to generate a second error instruction if said errors are detected in the second data signal and transmit the second error instruction to the switching system.

5. The fiber optic node as in claim 4 wherein the switching system is configured to transmit the first data signal in response to receiving the second error instruction.

6. A method of providing fiber optic errorless switching, the method comprising:

converting a first data signal from an optical format to an electrical format;

converting a second data signal from the optical format to the electrical format;

aligning the first data signal and the second data signal by buffering the first data signal and the second data signal and delaying one of the signals;

transferring the first data signal if errors are detected in second data signal; and transferring the second data signal if said errors are detected in the first data signal.

7. The method as in claim 6 wherein transferring the second data signal if said errors are detected in the first data signal further includes monitoring the first data signal for said errors and generating a first error instruction.

8. The method as in claim 6 wherein transferring the first data signal if said errors are detected in the second data signal further includes monitoring the second data signal for said errors and generating a second error instruction.

* * * * *